(12) United States Patent
De Valicourt et al.

(10) Patent No.: US 12,210,197 B2
(45) Date of Patent: Jan. 28, 2025

(54) HIGH EFFICIENCY VERTICAL GRATING COUPLER FOR FLIP-CHIP APPLICATION

(71) Applicant: IPG PHOTONICS CORPORATION, Oxford, MA (US)

(72) Inventors: Guilhem De Valicourt, Jersey City, NJ (US); Michael Kossey, Belmar, NJ (US)

(73) Assignee: Lumentum Operations LLC, San Jose, CA (US)

( * ) Notice: Subject to any disclaimer, the term of this patent is extended or adjusted under 35 U.S.C. 154(b) by 267 days.

(21) Appl. No.: 17/763,399

(22) PCT Filed: Sep. 24, 2020

(86) PCT No.: PCT/US2020/052361
§ 371 (c)(1),
(2) Date: Mar. 24, 2022

(87) PCT Pub. No.: WO2021/061886
PCT Pub. Date: Apr. 1, 2021

(65) Prior Publication Data
US 2022/0404562 A1    Dec. 22, 2022

Related U.S. Application Data

(60) Provisional application No. 62/906,851, filed on Sep. 27, 2019.

(51) Int. Cl.
*G02B 6/42* (2006.01)
*G02B 6/12* (2006.01)
(Continued)

(52) U.S. Cl.
CPC ....... *G02B 6/4206* (2013.01); *G02B 6/12004* (2013.01); *G02B 6/1228* (2013.01); *G02B 6/124* (2013.01); *G02B 6/30* (2013.01)

(58) Field of Classification Search
CPC .............. G02B 6/4206; G02B 6/12004; G02B 6/1228; G02B 6/124; G02B 6/30
See application file for complete search history.

(56) References Cited

U.S. PATENT DOCUMENTS

| | | |
|---|---|---|
| 2006/0177173 A1 | 8/2006 | Shastri et al. |
| 2010/0111473 A1 | 5/2010 | Pinguet et al. |
| | (Continued) | |

OTHER PUBLICATIONS

International Search Report and Written Opinion for Application No. PCT/US2020/052361, mailed on Dec. 17, 2020, 6 pages.
(Continued)

*Primary Examiner* — Michael P Mooney
(74) *Attorney, Agent, or Firm* — Harrity & Harrity, LLP (57) ABSTRACT

A method and system for forming a photonic device. A photonic device may include a substrate, a cladding layer disposed on the substrate, an electrical device region formed within the cladding layer, the electrical device region having a plurality of electrical device component layers that include at least one metal layer, and a grating region formed within the cladding layer, the grating region including a grating coupler and the at least one metal layer. The at least one metal layer is deposited simultaneously in the electrical device and grating regions and is used in the grating region to reflect light emitted from the grating coupler.

17 Claims, 11 Drawing Sheets

(51) Int. Cl.
G02B 6/122 (2006.01)
G02B 6/124 (2006.01)
G02B 6/30 (2006.01)

(56) References Cited

U.S. PATENT DOCUMENTS

| | | |
|---|---|---|
| 2013/0209026 A1 | 8/2013 | Doany et al. |
| 2014/0193115 A1 | 7/2014 | Popovic |
| 2015/0260913 A1* | 9/2015 | Li .......................... G02B 6/124 385/14 |
| 2016/0363729 A1 | 12/2016 | Baiocco et al. |

OTHER PUBLICATIONS

Extended European Search Report for Application No. EP20869284.8, mailed on Sep. 4, 2023, 8 pages.

* cited by examiner

FIG. 1

PRIOR ART

FIG. 2

FIG. 4D Mechanical lift off

FIG. 4C Back side dicing

FIG. 4B Deep etch

HIGH EFFICIENCY VERTICAL GRATING COUPLER FOR FLIP-CHIP APPLICATION

CROSS-REFERENCE TO RELATED APPLICATIONS

The present application claims the benefit of U.S. Provisional Patent Application Ser. No. 62/906,851 filed Sep. 27, 2019, which is fully incorporated herein by reference.

BACKGROUND OF THE DISCLOSURE

Technical Field

The technical field relates generally to photonic devices and more specifically to photonic integrated circuits (PICs) that implement the use of a vertical grating coupler to optically couple optical fibers to PICs.

Background Discussion

The demand for data transport bandwidth is constantly increasing, which necessitates methods for transmitting higher volumes of data. Traditional electrical interconnects based on copper have proven to be a bottleneck for this growing demand due to various limitations associated with this approach. Optical solutions, including silicon photonics based optical interconnects, offer a viable solution to the deficiencies presented by traditional copper-based technologies. This is in part because fully integrated photonic circuits with lower cost and large-scale integration potential can be achieved due to the compatibility of these optics-based approaches with silicon microelectronics processes. By taking advantage of the existing CMOS-VLSI infrastructure, silicon photonics is considered to be a promising and economical platform for the monolithic integration of various active and passive optoelectronic devices used in optical interconnects, such as modulators, photodetectors, grating couplers, and optical splitters/combiners.

Although the silicon photonics platform is viewed as a key driver for building the next generation of low cost on chip optical interconnects, a major issue facing silicon photonic chips is efficient coupling of light to and from optical fibers. This is due to the large mismatch between the mode sizes of the optical fiber and the silicon waveguides. Fiber to chip coupling can be accomplished using in-plane coupling, which is also often referred to as edge coupling, or grating couplers, which enable the coupling of light from the surface of the chip.

Figure 1:
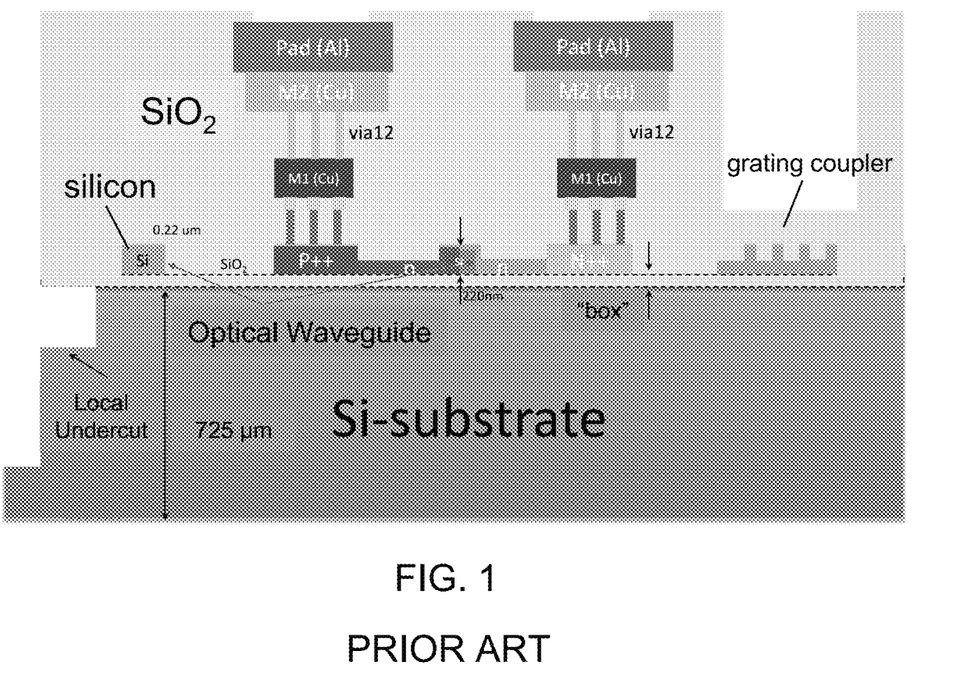
FIG. 1 is a cross-sectional view of a prior art photonic device.

FIG. 1 is a cross-sectional view of one example of conventional silicon photonic waveguide devices that feature a p-n junction structure having two levels of metal. The left side of FIG. 1 is configured for edge coupling, whereas the right side of FIG. 1 is configured with a vertical grating coupler featuring semi-etched or fully etched Si. The photonic device of FIG. 1 also includes a silicon-on-insulator (SOI) photonic platform, which refers to the use of a layered silicon-insulator-silicon substrate in place of conventional silicon substrates in semiconductor manufacturing. A typical SOI substrate contains a layer of silicon dioxide ($SiO_2$) at a predetermined depth within a silicon wafer. The inclusion of the buried insulator (referred to as buried oxide (BOX)) serves as a cladding, so as to prevent light leakage to the silicon layer. The SOI architecture is characterized by the high index contrast of silicon compared to its oxide and allows for sub-micron scale single mode wire waveguides.

Edge coupling is the preferred solution for final packaged modules due to its low insertion loss, wide bandwidth, and low polarization dependent loss (PDL). However, grating couplers allow for wafer-scale testing prior to full assembly and fiber attachment. Traditional uniform gratings exhibit some limitations, such as narrow bandwidth and high coupling losses of greater than 60%. Besides the large mode mismatch between the grating and the optical fiber, the low directionality of the grating also contributes to poor coupling efficiency. In particular, poor directionality results in a significant fraction of the optical power emitted by the grating diffracting downward into the substrate rather than upward toward the fiber. Various solutions have been proposed to improve directionality and reduce the power leakage into the substrate, but many of these methods require additional processing steps or non-standard structures which limits their deployment in standard silicon photonic processing platforms. In addition, these approaches are often not compatible with flip-chip assembly processes.

SUMMARY

Aspects and embodiments are directed to a photonic device and method for forming the same. The photonic device may include a substrate, a cladding layer disposed on the substrate, an electrical device region formed within the isolation layer, the electrical device region having a plurality of electrical device component layers that include at least one metal layer, and a grating region formed within the cladding layer, the grating region including a grating coupler and the at least one metal layer.

According to one embodiment, the at least one metal layer of the electrical device region and the grating region is formed simultaneously.

According to some embodiments, the substrate is a silicon on insulator (SOI) substrate having a silicon (Si) substrate, a buried oxide (BOX) layer disposed on the Si substrate, and a Si layer disposed on the BOX layer that is configured to form the grating coupler. In another embodiment, the Si substrate is configured such that an optical fiber can be optically coupled to the grating coupler. In another embodiment, material of the cladding layer is disposed between the at least one metal layer and the grating coupler of the grating region. In another embodiment, the at least one metal layer of the grating region is configured to reflect light emitted from the grating coupler. In another embodiment, the at least one metal layer of the grating region is disposed at a distance from the grating coupler such that destructive interference between reflected light from the at least one metal layer and the light emitted from the grating coupler is minimized. In another embodiment, the optical fiber couples to the grating coupler with a coupling efficiency of at least 70%.

In some embodiments, the plurality of electrical device component layers includes at least two metal layers and the grating region includes at least one of the at least two metal layers.

According to at least one embodiment, the photonic device is configured to be flip-chip bonded to a packaging substrate.

Some embodiments include a method for forming a photonic device. The method may include providing a substrate, and processing the substrate, wherein processing the substrate includes forming an electrical device region within a cladding layer, the electrical device region including a plurality of electrical device component layers that include at least one metal layer, and forming a grating region within the cladding layer, the grating region including a grating coupler and the at least one metal layer, wherein the at least one metal layer is deposited simultaneously in each of the electrical device region and the grating region.

In some embodiments, the substrate is provided as a silicon on insulator (SOI) substrate having a silicon (Si) substrate, a buried oxide (BOX) layer disposed on the Si substrate, and a Si layer disposed on the BOX layer, the grating coupler of the grating region formed from the Si layer. In one embodiment, processing further includes selectively removing Si substrate material that extends under the grating region, wherein the Si substrate material is selectively removed such that an optical fiber can be optically coupled to the grating coupler. According to at least one embodiment, the at least one metal layer is deposited in the grating region such that light emitted from the grating coupler is reflected by the at least one metal layer. In some embodiments, selectively removing the substrate material includes at least one of a mechanical removal procedure and an etching procedure. In accordance with at least one embodiment, selectively removing the substrate material includes forming a ledge that extends under at least a portion of the grating region. In another embodiment, processing includes forming at least two metal layers, and one of the at least two metal layers is formed within the grating region.

In another embodiment, the method further includes optically coupling an optical fiber to the grating coupler, and selecting the one of the at least two metal layers, the one of the at least two metal layers selected such that light emitted from the grating coupler is reflected, and reflected light from the one of the at least two metal layers and the light emitted from the grating coupler do not destructively interfere with one another.

In some embodiments, processing includes depositing the cladding layer, the cladding deposited such that material of the cladding layer is disposed between the at least one metal layer of the grating region and the grating coupler.

In some embodiments, forming the plurality of electrical device component layers further includes forming a contact pad, and the method further comprises flip-chip bonding the photonic device to a packaging substrate via the contact pad.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Described herein are architectures for photonic devices, particularly optical transmitters, that include a vertical grating coupler and at least one reflective metal layer formed during fabrication of the photonic device. For instance, one or more metal layers used in forming an electrical device region of the photonic device can be used as reflective layers for the vertical grating coupler when the photonic device is flip-chip mounted to another substrate. This design offers several advantages, including a high coupling efficiency and the ability to be fully compatible with both current silicon photonic processes and flip-chip assembly techniques.

Figure 2:
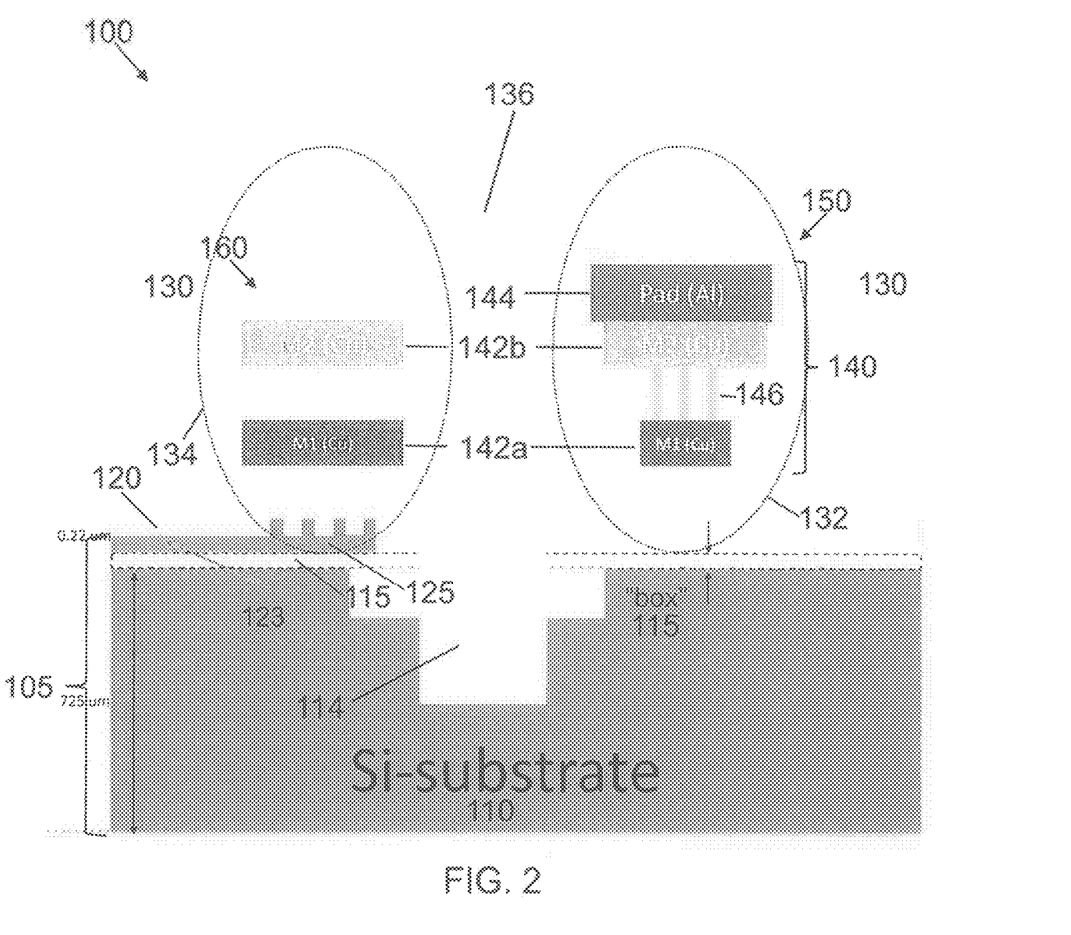
FIG. 2 is a cross-sectional view of one example of a photonic device in accordance with aspects of the invention.

FIG. 2 is a cross-sectional view of a photonic device, generally indicated at 100, according to one embodiment of the invention. The photonic device includes a substrate 105, which may be an SOI substrate, and a cladding layer 130 disposed on the substrate 105, where the cladding layer 130 itself includes layers of material as discussed in more detail below.

In this example, an SOI substrate 105 is used that includes a Si substrate 110, a buried oxide (BOX) layer 115 disposed on the Si substrate 110 and a Si layer 120 disposed on the BOX layer 115. The Si layer 120 is etched or otherwise formed into a waveguide 123 and a grating coupler 125, as described in further detail below. SOI substrates are used in the examples described herein, although other semiconductor substrates, including silicon, germanium, sapphire, and other suitable substrate materials and combinations of these materials are also within the scope of this disclosure. According to this example, the SOI substrate 105 is configured with a Si substrate 110 having a thickness of 725 microns, the BOX layer 115 has a thickness of 2-3 microns (μm), and the Si layer 120 has a thickness of 220 nm, although it is to be appreciated that any of these thicknesses can vary depending on the desired application.

The cladding layer 130 may actually comprise several layers of cladding material deposited or grown during separate processing steps. According to one embodiment, the cladding layer 130 is a dielectric material, and in some instances can also be an oxide such as $SiO_2$. The cladding layer 130 can function to provide structural support for the reflective layer(s) of the grating region 134 (described below) without interfering with the proper operation of the photonic device 100. The cladding layer 130 also functions as an isolation and/or passivation layer for the electrical device 150 (described below), as will be recognized by those skilled in the art.

An electrical device region 132 is formed within the cladding layer 130. The electrical device, generally indicated at 150, of the electrical device region 132 includes a plurality of electrical device component layers 140 that include at least one metal layer 142. In the example shown in FIG. 2, the plurality of electrical device component layers 140 includes a first metal layer 142a and a second metal layer 142b, each of which comprise copper, although other reflective metallization materials are also included within the scope of this disclosure, including aluminum, silver, gold, titanium, tungsten, etc., as well as metal alloys and other suitable metallization materials. Conventional semiconductor metallization processes may be used to deposit the metal layers, including evaporation and/or sputtering techniques.

The at least one metal layer 142 may have a thickness suitable for performing its respective function in the electrical device 150 and for reflecting light in the grating structure 160 discussed below. In accordance with at least one embodiment, the metal layer 142 has a thickness of at least 100 nm, and in some instances the metal layer 142 has a thickness of a few microns. Suitable thickness values that lie in between this minimum and maximum include thicknesses that range from 0.3-1.2 microns. As also discussed below, the location of the at least one metal layer 142 within the electrical device component layers 140 also plays a role in contributing to the enhanced performance of the grating structure 160.

Other electrical device component layers 140 included in electrical device 150 include via 146 and metal pad 144. According to at least one embodiment, one or more of the electrical device component layers 140 function as an electrical interconnect, as also shown in the electrical device 550 of FIG. 5. Each of the electrical device component layers 140 may be deposited using one or more conventional semiconductor processing techniques, including lithography (i.e., using photoresist and exposure with mask) and/or shadow masking, metallization, dry etch, wet etch, implant, etc. The electrical device 150 may perform any one of a number of different optical, electrical, or optoelectronic functions, such as waveguiding, photodetecting, or any other function that contributes to silicon performing as an optical medium. The electrical device 150 can be any optical, electrical, or optoelectronic device that includes at least one metal layer 142 in the electrical device component layers 140. According to at least one embodiment, the electrical device 150 is an integrated circuit (IC) and/or a component of a PIC.

A grating region 134 is also formed within the cladding layer 130. The grating structure, generally indicated at 160, of the grating region 134 includes a grating coupler 125 and at least one metal layer 142, which in this example includes the first metal layer 142a and the second metal layer 142b of the electrical device 150. The grating region 134 is horizontally adjacent to the electrical device region 132. The grating coupler 125 is constructed from the Si layer 120 of the SOI substrate 105 and is configured to be optically coupled to an optical fiber. Metal layers 142a and 142b as components of the grating structure 160 are formed in the grating region 134 and are deposited at the same time (i.e., simultaneously) as metal layers 142a and 142b of the electrical device 150 formed in the electrical device region 132.

In the embodiment shown in FIG. 2, the metal layers of each respective region 132 and 134 (also see 532, 534 in FIG. 5) are separated by at least a portion of the cladding layer 130 (530 in FIG. 5), meaning that during processing metal from the once continuous metal layer was removed in the area between the two regions 134 and 132. In addition, the metal layers 142a and 142b residing in the grating region 134 as shown in FIG. 2 are separated from one another by cladding material 130. A recess 136 may also be present in the cladding layer 130 to separate the metal layer(s) 142a and 142b of the grating region 134 and electrical device region 132. The separation between these two regions of metal may be accomplished using any one of a number of different material removal methods known in the art, including a combination of masking and etching techniques. As discussed in further detail below, at least one of the metal layers 142a and 142b of the grating region 134 can be used to reflect light emitted from the grating coupler 125 when an optical fiber is coupled to the grating coupler 125 (e.g., see FIG. 6).

Figure 7A:
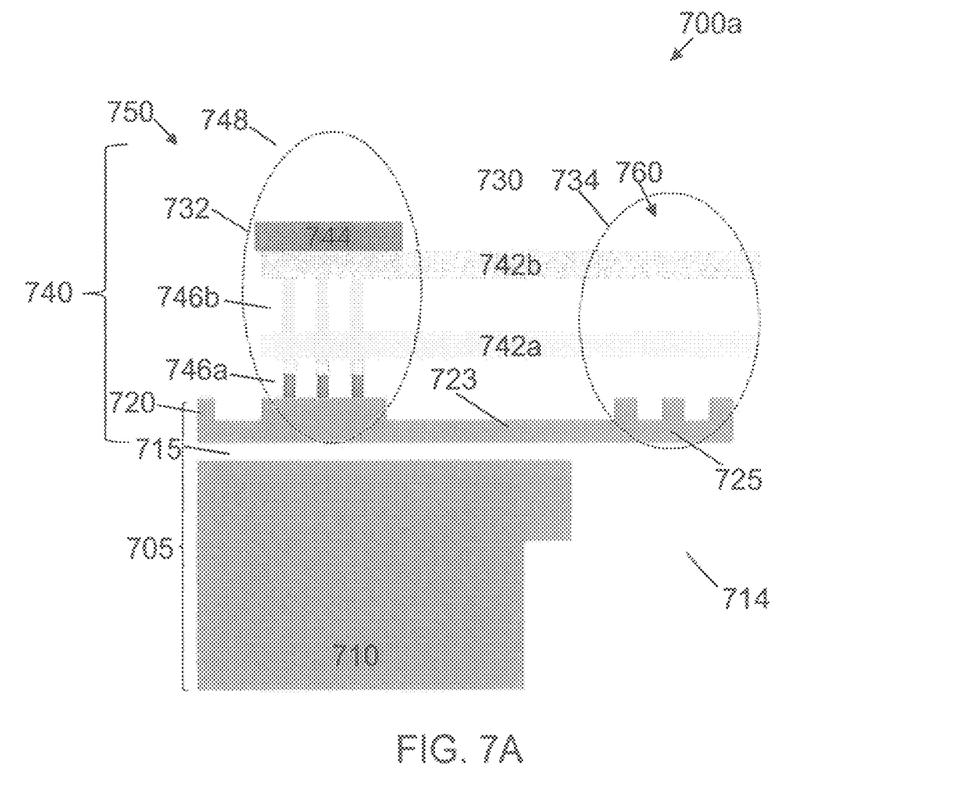
FIG. 7A is a cross-sectional view of another example of a photonic device in accordance with aspects of the invention.
Figure 7B:
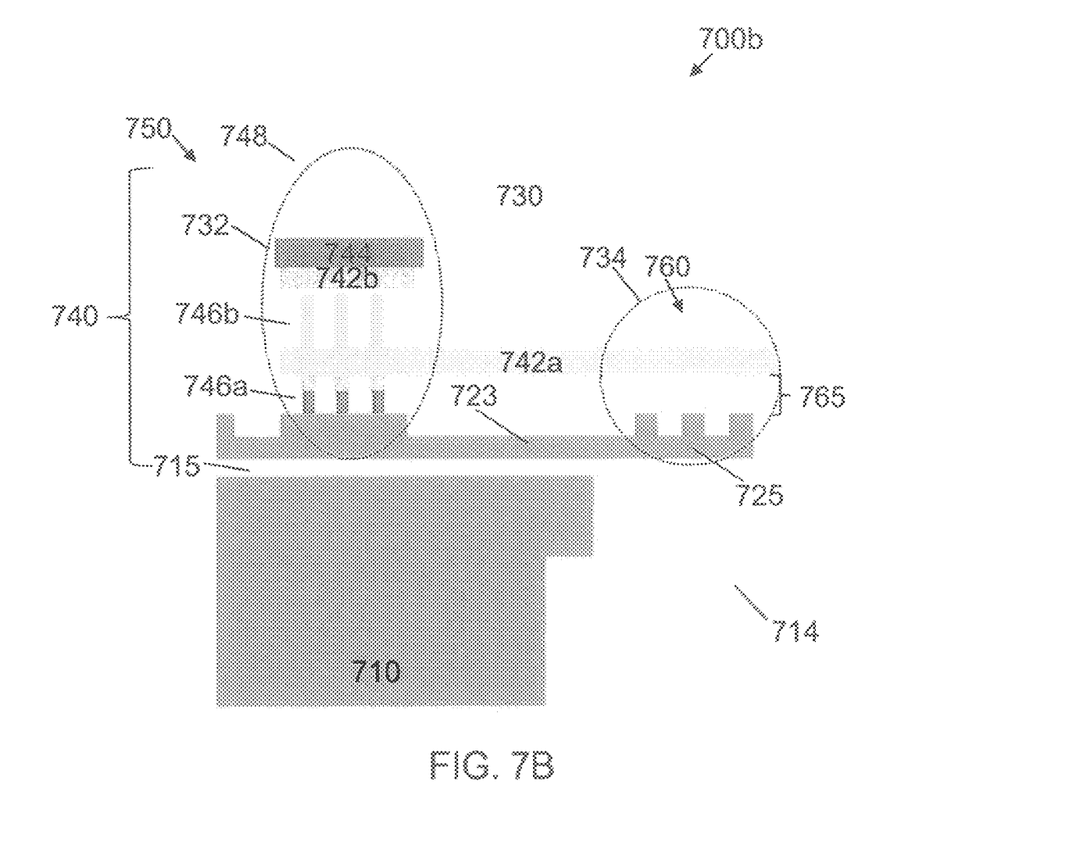
FIG. 7B is a cross-sectional view of another example of a photonic device in accordance with aspects of the invention.
Figure 7C:
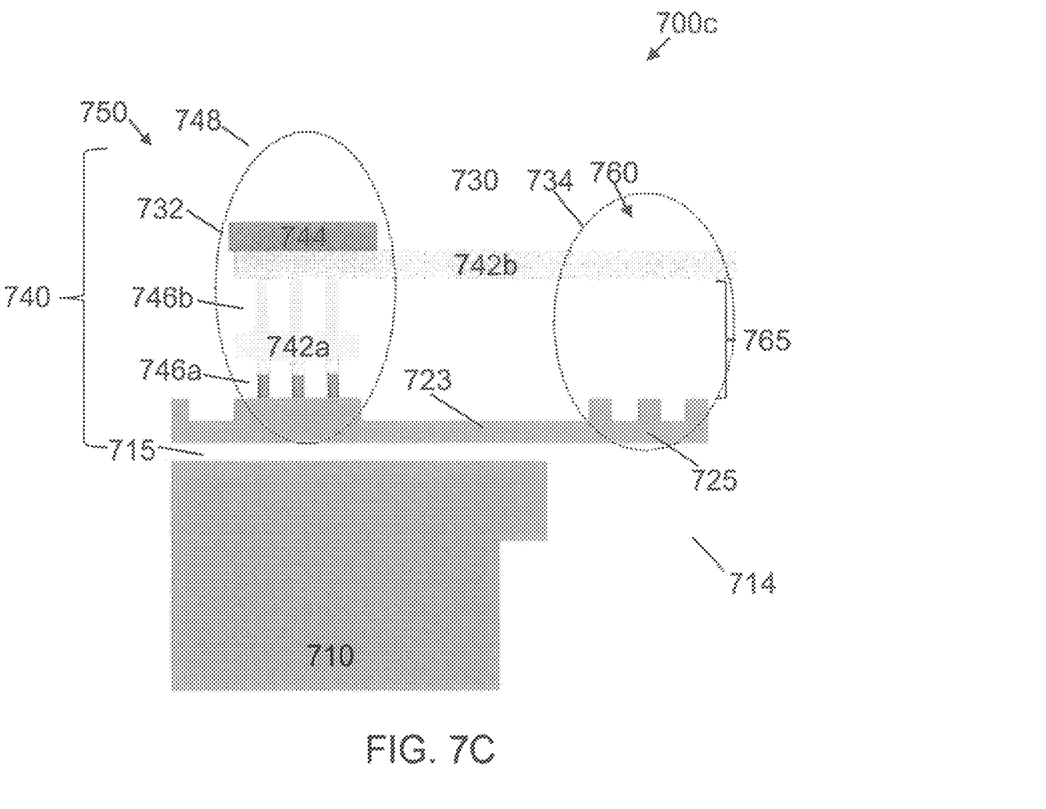
FIG. 7C is a cross-sectional view of another example of a photonic device in accordance with aspects of the invention.

In alternative embodiments, the metal layer 142 in each of the electrical device region 132 and the grating region 134 is not separated by at least a portion of the cladding layer 130, i.e., it may be continuous. Several non-limiting examples of such a configuration are shown in FIGS. 7A-7C. In the photonic device 700a of FIG. 7A, the electrical device 750 includes a first metal layer 742a that is deposited simultaneously into electrical device region 732 and grating region 734 of the grating structure 760. First metal layer 742a is supported by cladding layer 730 and extends continuously between the two regions 732 and 734. Masking and etching techniques on the cladding and metal layers in the area between region 732 and 734 are therefore not performed (as they are for the structures shown in FIGS. 2 and 5). The photonic device 700a of FIG. 7A also includes a second metal layer 742b that is arranged in a similar manner as the first metal layer 742a. The photonic device of FIG. 7A includes similar features as shown in photonic device 100 of FIG. 2, having an SOI substrate 705 with a silicon substrate 710, BOX layer 715, and silicon layer 720 that includes waveguide 723 and grating coupler 725 features. Because the at least one metal layer (e.g., 742a and/or 742b) is deposited simultaneously into the electrical device and grating regions 732 and 734, the at least one metal layer 742a and/or 742b of the grating region 734 and the electrical device region 732 are each disposed within the cladding layer 730 at a substantially equal distance from the silicon substrate 710. According to some embodiments, the plurality of electrical device component layers 740 includes at least two metal layers and the grating region 734 includes at least one of the at least two metal layers. Two non-limiting examples of such a configuration are shown in FIGS. 7B and 7C.

Another example embodiment is shown in FIG. 7B. In this instance, the first metal layer 742a is continuous across both electrical device region 732 of electrical device 750 and grating region 734 of grating structure 760, but second metal layer 742b is not present in grating region 734. This may be because a distance 765 between the first metal layer 742a and the grating coupler 725 in the grating structure 760 allows for enhanced functionality of the grating structure 760, as discussed in further detail below. In the alternative embodiment shown in photonic device 700c of FIG. 7C, the second metal layer 742b is continuous across both regions 732 and 734, and the first metal layer 742a is not present in grating region 734. In this instance, the second metal layer 742b may be used because the distance 765 between the second metal layer 742b and the grating coupler 725 allows for enhanced functionality of the grating structure 760. It is to be appreciated that although the electrical device 750 of photonic devices 700a-700c exemplified in FIGS. 7A-7C has two metal layers, according to some embodiments, only one metal layer may be used, or more than two metal layers may be used.

Figure 3A:
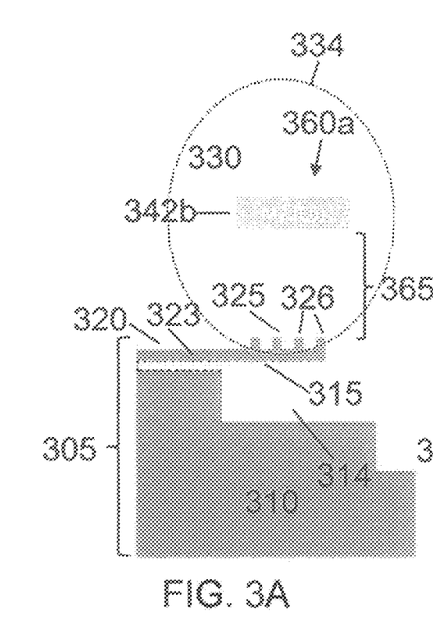
FIG. 3A is a cross-sectional view of another example of a photonic device in accordance with aspects of the invention.
Figure 3B:
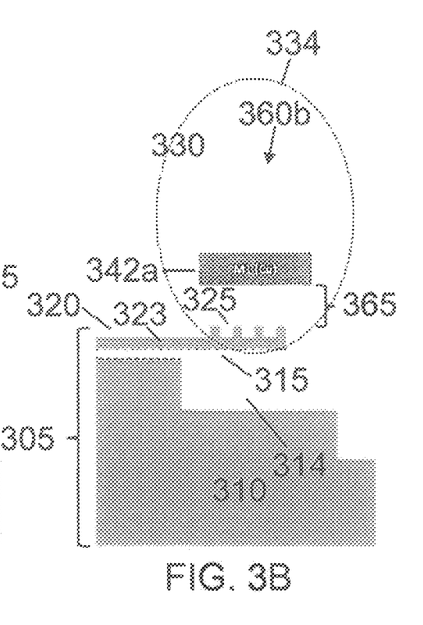
FIG. 3B is a cross-sectional view of yet another example of a photonic device in accordance with aspects of the invention.

Cross-sectional views of example grating regions are shown in FIGS. 3A and 3B. In FIG. 3A, the second metal 342b of the corresponding electrical device component layers (which are not shown in this figure, but would include the second metal 342b) is used as a reflective element in the grating structure 360a for light either coming from or being directed to the grating coupler. From a processing standpoint, this means that the grating region 334 is masked off during deposition of the first metal layer 342a (but would be open during deposition of the second metal layer 342b so as to be simultaneously metallized), or alternatively, first metal 342a could be deposited but later removed from the grating region 334.

Figure 3C:
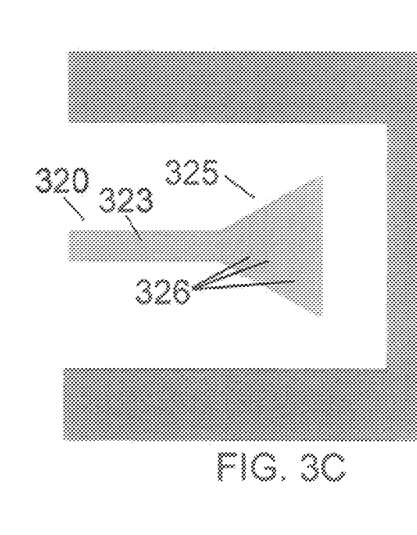
FIG. 3C is a top view of a silicon waveguide and grating coupler used in photonic devices in accordance with aspects of the invention.

The grating region 334 of the photonic device of FIG. 3A includes similar features as shown in photonic device 100 of FIG. 2, having an SOI substrate 305 with a silicon substrate 310, BOX layer 315, and silicon layer 320 that features a waveguide 323 and a grating coupler 325. The grating coupler 325 includes patterned Si with periodic spaced apart segments 326 of Si that have been etched into the silicon layer 320. A top view of the waveguide 323 and grating coupler 325 is shown in FIG. 3C. It is to be appreciated that the width, thickness, spacing, and period of the segments 326 are specific to the desired device design and application. The grating coupler 325 of FIG. 3C also illustrates an example of an inverted taper design where the width of the segments 326 are longitudinally tapered. Multiple grating designs are within the scope of this disclosure, including apodized, double layer, and sub-wavelength gratings.

Referring back to FIG. 3A, the layer of metal 342b is separated from the grating coupler 325 within cladding material 330 by a distance 365, and a similar arrangement is shown in FIG. 3B, where metal layer 342a is separated from the grating coupler 325 by distance 365. The distance 365 between the grating coupler 325 and the metal layer 342 is such that the functionality of the grating structure 360 is not compromised, and in many instances the functionality is enhanced when the grating coupler 325 is optically coupled to an optical fiber. For example, as also discussed below in reference to FIG. 9, if the distance between the metal layer 342 and the grating coupler 325 is too small or too large, then destructive interference occurs. This can occur when the distance 365 between the metal layer 342 and the grating coupler 365 is an integer multiple of the operational wavelength of the signal light. The metal layer 342 of the grating region 334 may therefore be disposed at a distance 365 from the grating coupler 325 such that destructive interference between reflected light from the metal layer 342 and the light emitted from the grating coupler 325 is minimized.

Returning to FIG. 3A, a portion of the Si substrate 310 has been selectively removed to open a recess 314 under the grating coupler 325 and grating region 334. This recess 314 can be further expanded and configured to accommodate an optical fiber that is optically coupled to the grating coupler 325 and the grating structure 360a. In accordance with at least one embodiment, the presence of the metal in the grating structure allows for the optical fiber and the grating coupler to define a coupling efficiency of at least 70%.

The grating region 334 of FIG. 3B is nearly identical to that of FIG. 3A, but in this instance, the first metal 342a of the corresponding electrical device component layers is used as the reflective element in the grating structure 360b. The other components of the structure are identical to that of FIG. 3A and are therefore not repeated here. As mentioned above, the selection of using one metal layer over another in the grating structure from the corresponding electrical device may depend on whether the distance between the metal layer and the grating coupler in the grating structure creates destructive interference between light reflected from the metal layer and light emitted from the grating coupler. Experimental results discussed below indicate that when destructive interference occurs, coupling losses are actually increased to a degree such that the coupling efficiency of the device drops below that of a conventional photonic device that does not include the reflective metal layer in the grating structure.

As indicated in FIGS. 2, 3A, 3B, and 7A-7C, a recess 114, 314, 714 is formed in the respective Si substrate 110, 310, 710 of the SOI substrate 105, 305, and 705 and this recess is a precursor for the functionality of the grating coupler in the grating region. This recess can be formed in a number of different ways, and in accordance with at least one embodiment the selective removal of the Si substrate material includes at least one of a mechanical removal procedure and an etching procedure.

Figure 4A:
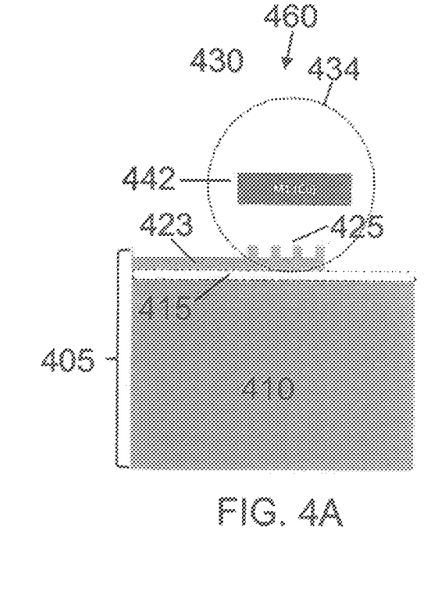
FIGS. 4A-4D are cross-sectional views of a photonic device at various stages in a fabrication process in accordance with aspects of the invention.
Figure 4B:
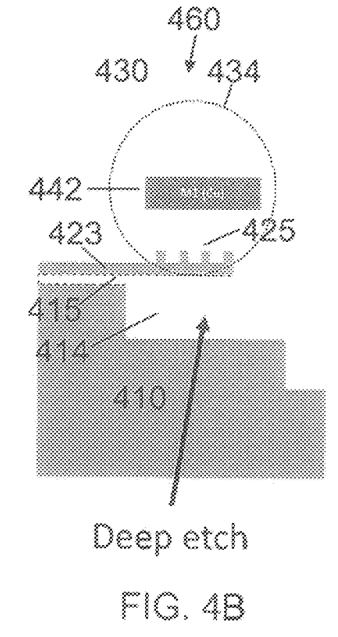

FIGS. 4A-4D illustrate one method for selectively removing Si substrate 410 material to form a recess 414 in the SOI substrate 405. FIG. 4A is a cross-sectional schematic of the grating region 434 after complete deposition of the cladding layer 430 and definition of the metal layer 2. In FIG. 4B, a first portion of the Si substrate 410 has been selectively removed and forms an undercut using an etching procedure such as a deep etch process. Another example of this etch is also shown in FIG. 2, where a deep etch is performed all the way around the grating structure 160. The undercut of FIG. 4B can be made by controlled etching using a wet etch. The undercut is etched directly below the BOX layer 415.

Figure 4C:
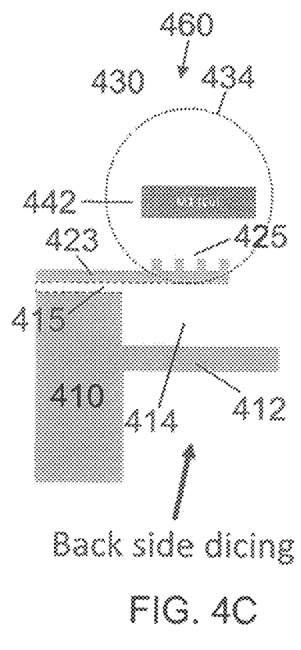

In FIG. 4C, a second portion of the Si substrate 410 has been selectively removed using a mechanical removal procedure. In this instance, the substrate material 410 is removed by backside dicing, which reduces the thickness of the Si substrate 410 in the region under the grating structure 460. As indicated in FIG. 4C, the backside dicing may be performed such that a ledge 412 is formed that extends under at least a portion of the grating region 434. Backside dicing can be accomplished using a dicing saw or grinding wheel or other mechanical removal techniques, such as laser scribing.

Figure 4D:
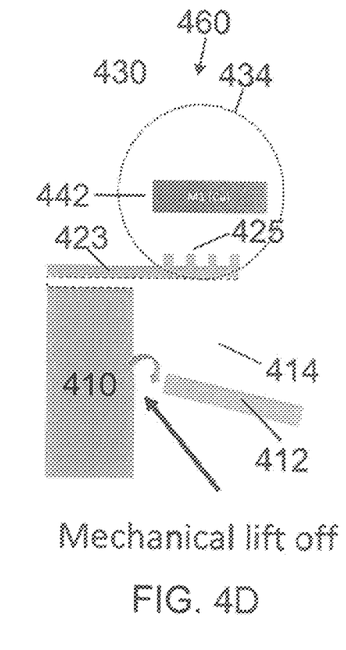

A mechanical process may also be used to remove the last portion (e.g., the ledge 412) of Si substrate material 410 to finish forming the recess 414, as shown in FIG. 4D. According to alternative embodiments, a wet or dry etch can also be performed to remove the remaining substrate material. Once Si substrate 410 material that extends under the grating region 434 (including ledge 412) is removed, the Si substrate 410 is configured such that an optical fiber can be optically coupled to the grating coupler 425 of the grating region 434. The dimensions of the recess 414 are such that there is enough space for the optical fiber to be placed therein near the grating coupler 425 and can be optically coupled to the grating coupler 425, as can be more clearly seen in FIG. 6.

It is to be appreciated that the removal of the substrate material as exemplified in FIGS. 4B-4D is just one example of a potential material removal process. Other removal methods and combination(s) of methods are also within the scope of this disclosure, including backside dicing or backside grinding to remove the silicon substrate, a wet etch process (i.e., chemical etching), and/or a laser removal process.

Figure 5:
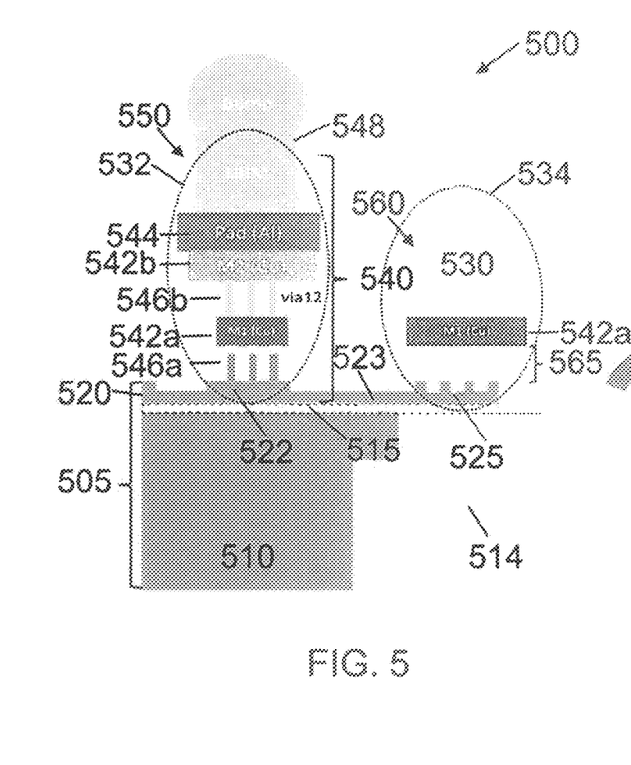
FIG. 5 is a cross-sectional view of another example of a photonic device in accordance with aspects of the invention.

FIG. 5 is an example of a photonic device, indicated generally at 500, that includes many of the same components of the photonic device 100 described above in reference to FIG. 2. As shown, photonic device 500 comprises an SOI substrate 505 and a cladding layer(s) 530 disposed on the substrate 505. The SOI substrate 505 includes a Si substrate 510, a BOX layer 515, and a Si layer 520 that forms a waveguide 523 and a grating coupler 525. In some instances, the Si layer 520 may also be patterned to form an electrical device substrate 522 for the electrical device 550. The electrical device 550 comprises a plurality of electrical device component layers 540, which include first and second metal layers 142a and 142b. Other electrical device component layers 540 include the electrical device substrate 522, vias 546a and 546b, metal pad 544, and electrical pad 548 (also referred to herein as a contact pad) that includes an under-bump metallization (UBM) connecter or pad formed in the cladding layer 530 under a bump.

According to this example, metal layer 542a is simultaneously deposited in the grating region 534 as part of the grating structure 560 during deposition of the metal layer 542a in the electrical device region 532. As indicated, cladding material 530 separates the metal material layers 542a of the respective electrical device region 532 of the electrical device 550 and the grating region 534 of the grating structure 560. Material of the cladding layer 530 is also disposed between the metal layer 542a (of the grating region 534) and the grating coupler 525, which are separated from one another by distance 565 (and distance 565 is similar to distance 365 and 765 as previously described). The presence of the cladding material 530 does not interfere or adversely affect the ability of the metal 542a to reflect light.

At least a portion of the Si substrate 510 material under the grating region 534 and grating structure 560 has been removed so as to form a recess 514 as described above and is configured such that an optical fiber can be optically coupled to the grating coupler 525 of the grating device 560.

Figure 6:
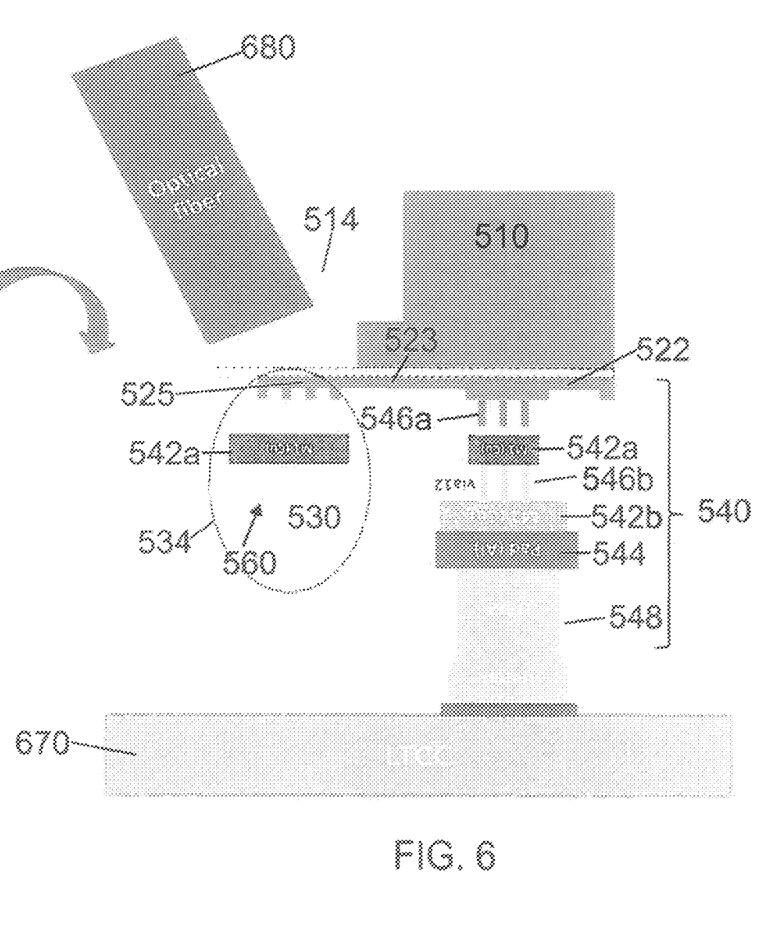
FIG. 6 is a cross-sectional view of the photonic device of FIG. 5 flip-chip bonded to a packaging substrate in accordance with aspects of the invention.

In accordance with at least one embodiment, the photonic device 500 of FIG. 5 is configured to be flip-chip bonded to a packaging substrate, as shown in FIG. 6. In this instance, the photonic device 500 is flipped over and the electrical or contact pad 548 is bonded to a packaging substrate 670. The packaging substrate 670 can be any one of a number of suitable packaging substrates, including ceramic substrates such as a low temperature co-fired ceramic (LTCC) multilayer substrate. An optical fiber 680 can then be positioned in the recess 514 formed from the selective removal of the Si substrate material 510 and optically coupled to the grating coupler 525 of the grating structure 560. According to one embodiment, the optical fiber 680 optically couples to the grating coupler with a coupling efficiency of at least 70%, as discussed in further detail below.

Signal light can either be transmitted to or received from the optical fiber 680 by the grating coupler 525. For example, light emitted from the optical fiber 680 can be transmitted to the grating coupler 525 and then guided along waveguide 523. In the alternative, light guided by the waveguide 523 can be directed by the grating coupler 525 into the optical fiber 680. In both instances, light emitted by the grating coupler 525 is reflected by metal layer 542a and prevented from escaping and causing coupling losses.

Figure 8A:
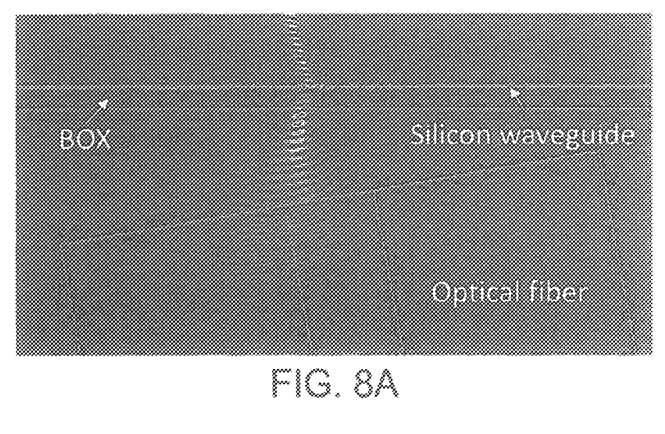
FIG. 8A is a simulated plot field of a conventional photonic device.
Figure 8B:
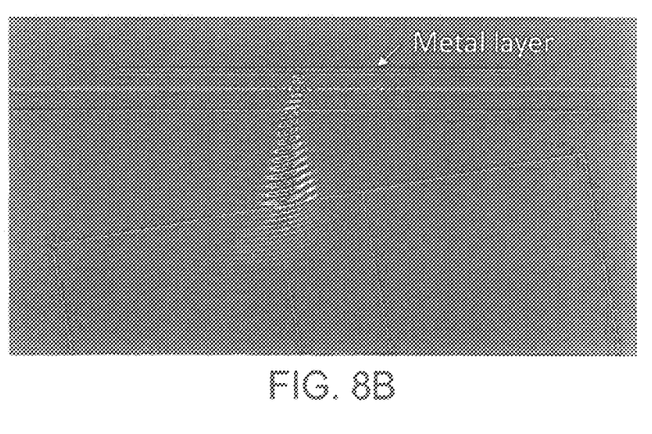
FIG. 8B is a simulated plot field of a photonic device constructed in accordance with aspects of the invention.

Two-dimensional finite-difference time domain (FDTD) simulations were carried out to analyze the performance of the grating structures described herein. FIG. 8A is a plot field diagram of a side view of a fiber coupled to a conventional photonic device having a vertical grating coupler without any reflective metal layer integrated as part of the grating structure. Without the use of the metal layer about 42.2% (i.e., coupling efficiency) of the power was radiated toward the substrate and coupled to the fiber. As can be seen in FIG. 8A, the conventional grating structure forms a bidirectional beam. In contrast, FIG. 8B is a field plot of a simulation that was performed with a photonic device such as that configured and shown in FIGS. 5 and 6 where a metal layer is included in the grating structure, and the results indicated that the coupling efficiency increased to 73.3%. As also indicated in FIG. 813, the grating structure of the invention forms a single, highly-directional light beam.

Figure 9:
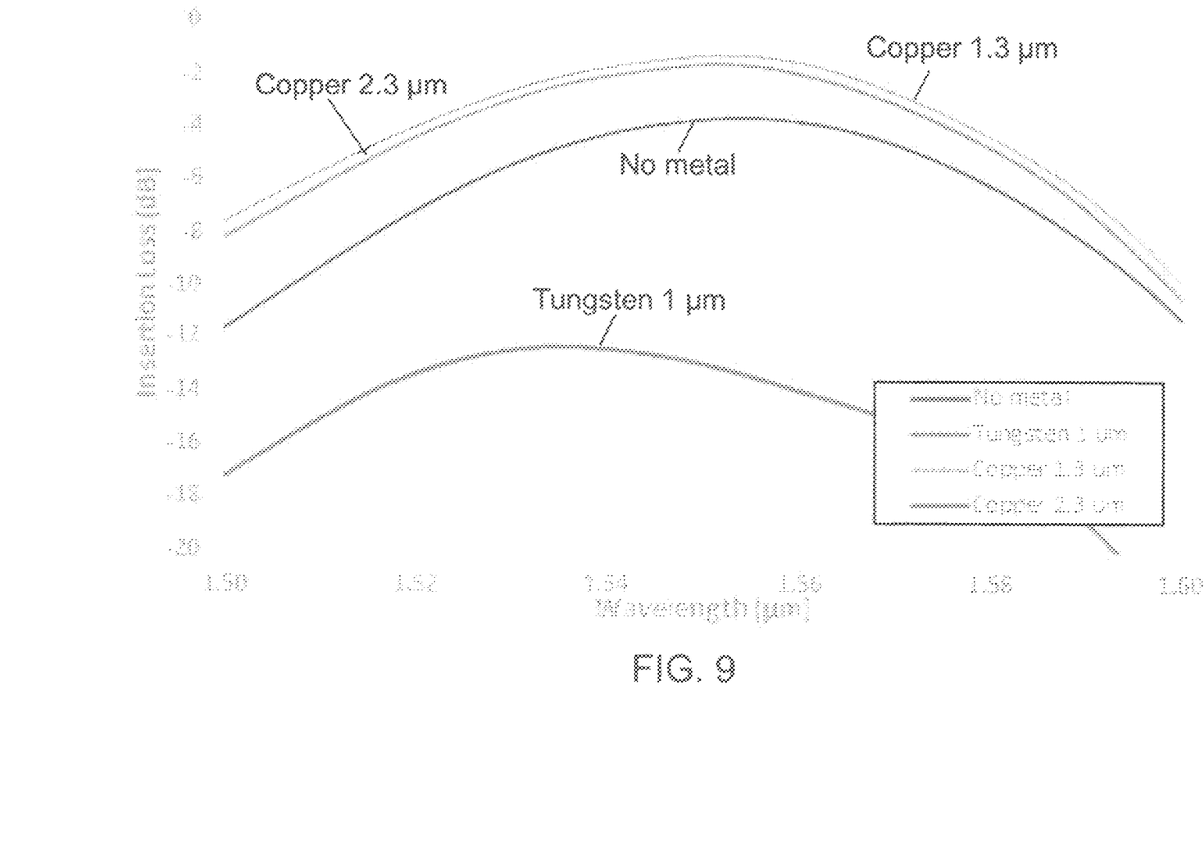
FIG. 9 is a graph of simulated insertion loss from a vertical grating coupler to fiber for several variants of the photonic device in accordance with aspects of the invention.

FIG. 9 plots simulated insertion losses from the grating coupler to the fiber for several variants of the photonic device described herein. Different metal materials positioned at varying distances away from the grating in the grating structure were tested: (1) tungsten at 1 micron from the grating, (2) copper at 1.3 microns, and (3) copper at 2.3 microns. A control (i.e., no metal reflector) was also included in the test. The results indicated that the grating structure of the invention that includes the metal reflector was capable of improving insertion losses by up to 2 dB (for both copper cases) as compared to a conventional grating with no metal reflector. The test also indicated that the position of the metal reflector was also important, in that destructive interference can occur if the distance between the metal layer and the grating coupler is an integer multiple of the operational wavelength. In such instances, insertion losses can actually increase over instances where a conventional grating configuration with no metal reflector is used. This detrimental result is indicated by the tungsten results in FIG. 9, where the tungsten metal reflector layer was placed at a distance of one micron away from the grating coupler.

Figure 10:
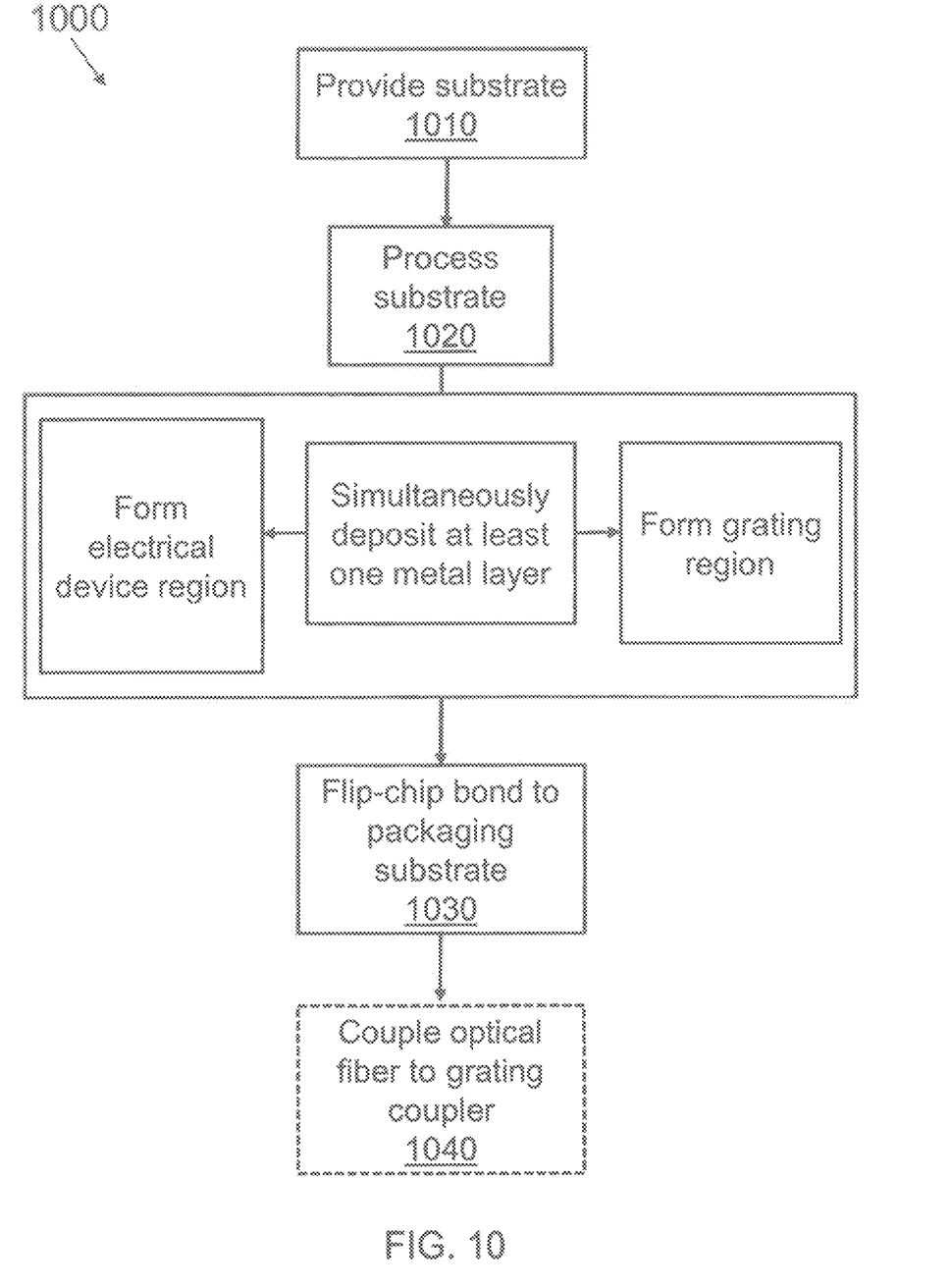
FIG. 10 is a block/flow diagram showing an illustrative method for fabricating a photonic device in accordance with aspects of the invention.

Referring now to FIG. 10, a method 1000 of forming a photonic device (e.g., 100, 500, 700a-c) is illustratively shown. Exemplary process procedures taken to form at least one embodiment of a photonic device are illustrated, although certain details and features have been left out of method 1000 of FIG. 10 that are apparent to a person of ordinary skill in the art. For example, a procedure may include one or more sub-procedures, and other embodiments may utilize procedures different from or in addition to those shown in method 1000.

The method 1000 may begin at procedure 1010 with providing a substrate, such as an SOI substrate as described herein. After procedure 1010 the method proceeds to procedure 1020. At procedure 1020, the method includes processing the substrate. The substrate may be processed to include waveguide and grating coupler structures, such as waveguide 523 and grating coupler 525 shown in FIG. 5. Processing the substrate also includes forming an electrical device region (e.g., 532) and a grating region (e.g., 534). At least one metal layer (e.g., 542*a*) is deposited simultaneously in the electrical device region and the grating region. Processing the substrate can also include depositing or otherwise forming a plurality of electrical device component layers (e.g., 540), and the at least one metal layer that is simultaneously deposited in the grating region can be one of these electrical device component layers. Procedure 1020 can also include selecting the metal layer (from metal layers in the plurality of electrical device component layers) such that when an optical fiber is coupled to the grating coupler, the distance (e.g., 565) between the metal layer and the grating coupler within the grating region does not cause destructive interference between light reflected from the metal layer and light emitted from the grating coupler. The electrical device and grating regions are formed within a cladding layer (e.g., 530). Multiple cladding layers can be deposited or otherwise used within the electrical device and grating regions. Processing the substrate can also include selectively removing Si substrate material under the grating region, as described above in reference to FIGS. 4A-4D. Removal of the Si substrate material is performed such that an optical fiber can be optically coupled to the grating coupler of grating region. This selective removal can be performed using at least one of a mechanical and etching removal procedure.

After procedure 1020, the method proceeds to procedure 1030, where the photonic device is flip-chip bonded to a packaging substrate, such as described above in reference to FIG. 6. Conventional bonding techniques may be utilized to bond the photonic device to the packaging substrate. An optical fiber can (optionally) be coupled to the grating coupler in procedure 1040. Conventional coupling techniques may be used, as recognized by those skilled in the art.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A photonic device, comprising:
a substrate;
a cladding layer disposed on the substrate;
an electrical device region formed within the cladding layer, the electrical device region having a plurality of electrical device component layers that include at least one metal layer; and
a grating region formed within the cladding layer, the grating region including a grating coupler and the at least one metal layer, wherein a distance between the grating coupler and the at least one metal layer in the grating region is based on an integer multiple of a wavelength of light configured to be emitted from the grating coupler into the grating region.

2. The photonic device of claim 1, wherein the at least one metal layer of the electrical device region and the grating region is formed simultaneously.

3. The photonic device of claim 1, wherein the substrate is a silicon on insulator (SOI) substrate having a silicon (Si) substrate, a buried oxide (BOX) layer disposed on the Si substrate, and a Si layer disposed on the BOX layer that is configured to form the grating coupler.

4. The photonic device of claim 3, wherein the Si substrate is configured such that an optical fiber can be optically coupled to the grating coupler.

5. The photonic device of claim 4, wherein material of the cladding layer is disposed between the at least one metal layer and the grating coupler of the grating region.

6. The photonic device of claim 4, wherein the at least one metal layer of the grating region is configured to reflect the light emitted from the grating coupler.

7. The photonic device of claim 6, wherein the at least one metal layer of the grating region is disposed at the distance from the grating coupler such that destructive interference between reflected light from the at least one metal layer of the grating region and the light emitted from the grating coupler is minimized.

8. The photonic device of claim 4, wherein the optical fiber couples to the grating coupler with a coupling efficiency of at least 70%.

9. The photonic device of claim 1, wherein the plurality of electrical device component layers includes at least two metal layers and the grating region includes at least one of the at least two metal layers.

10. The photonic device of claim 1, wherein the photonic device is configured to be flip-chip bonded to a packaging substrate.

11. The photonic device of claim 1, wherein the at least one metal layer is continuous across the electrical device region and the grating region.

12. The photonic device of claim 1, wherein the at least one metal layer of the electrical device region and the grating region is disposed within the cladding layer at a substantially equal distance from the substrate.

13. The photonic device of claim 1, wherein the at least one metal layer is a first metal layer, and wherein the electrical device region includes a second metal layer.

14. The photonic device of claim 13, wherein the grating region includes the second metal layer.

15. The photonic device of claim 13, wherein a distance between the first metal layer and the substrate is greater than a distance between the second metal layer and the substrate.

16. The photonic device of claim 13, wherein a distance between the first metal layer and the substrate is less than a distance between the second metal layer and the substrate.

17. The photonic device of claim 3, wherein the Si layer includes a waveguide.

\* \* \* \* \*